United States Patent
Berger et al.

(10) Patent No.: US 11,676,319 B2
(45) Date of Patent: *Jun. 13, 2023

(54) AUGMENTED REALITY ANTHROPOMORPHIZATION SYSTEM

(71) Applicant: Snap Inc., Santa Monica, CA (US)

(72) Inventors: Itamar Berger, Hod Hasharon (IL); Piers George Cowburn, London (GB); Avihay Assouline, Tel Aviv (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,071

(22) Filed: Jul. 12, 2022

(65) Prior Publication Data

US 2022/0343574 A1    Oct. 27, 2022

Related U.S. Application Data

(63) Continuation of application No. 17/248,835, filed on Feb. 10, 2021, now Pat. No. 11,450,050, which is a continuation of application No. 16/119,397, filed on Aug. 31, 2018, now Pat. No. 10,997,760.

(51) Int. Cl.
*G06T 11/60* (2006.01)
*G06T 13/80* (2011.01)
*G06V 20/10* (2022.01)

(52) U.S. Cl.
CPC .............. *G06T 11/60* (2013.01); *G06T 13/80* (2013.01); *G06V 20/10* (2022.01)

(58) Field of Classification Search
None
See application file for complete search history.

(56) References Cited

U.S. PATENT DOCUMENTS

| | | | |
|---|---|---|---|
| 666,223 | A | 1/1901 | Shedlock |
| 4,581,634 | A | 4/1986 | Williams |
| 4,975,690 | A | 12/1990 | Torres |
| 5,072,412 | A | 12/1991 | Henderson, Jr. et al. |

(Continued)

FOREIGN PATENT DOCUMENTS

| | | |
|---|---|---|
| CA | 2887596 A1 | 7/2015 |
| CN | 112639892 A | 4/2021 |

(Continued)

OTHER PUBLICATIONS

"A Whole New Story", Snap, Inc., [Online] Retrieved from the Internet: <URL: https://www.sriap.com/en-US/news/>, (2017), 13 pgs.

(Continued)

*Primary Examiner* — Yi Wang
(74) *Attorney, Agent, or Firm* — Schwegman Lundberg & Woessner, P.A.

(57) ABSTRACT

Embodiments of the present disclosure relate generally to systems for enhancing a first media item through the addition of a supplemental second media item. A user may provide a request to enhance a selected media item, and in response, an enhancement system retrieves and presents a curated collection of supplemental content to be added to the media, to the user. The user may review the curated collection of supplemental content, for example by providing a tactile input to scroll through the curated collection of content.

20 Claims, 13 Drawing Sheets

(56) References Cited

U.S. PATENT DOCUMENTS

| | | |
|---|---|---|
| 5,361,205 A | 11/1994 | Nishino et al. |
| 5,493,692 A | 2/1996 | Theimer et al. |
| 5,699,444 A | 12/1997 | Palm |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,009,190 A | 12/1999 | Szeliski et al. |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,525,731 B1 | 2/2003 | Suits et al. |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,478,402 B2 | 1/2009 | Christensen et al. |
| 7,496,347 B2 | 2/2009 | Puranik |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,703,140 B2 | 4/2010 | Nath et al. |
| 7,720,554 B2 | 5/2010 | Dibernardo et al. |
| 7,737,965 B2 | 6/2010 | Alter et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,912,896 B2 | 3/2011 | Wolovitz et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb |
| 8,146,001 B1 | 3/2012 | Reese |
| 8,161,115 B2 | 4/2012 | Yamamoto |
| 8,161,417 B1 | 4/2012 | Lee |
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,230,258 B2 | 7/2012 | Yamagami |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |

(56) References Cited

U.S. PATENT DOCUMENTS

| | | |
|---|---|---|
| 8,472,935 B1 | 6/2013 | Fujisaki |
| 8,502,903 B2 | 8/2013 | Kashitani |
| 8,510,383 B2 | 8/2013 | Hurley et al. |
| 8,525,825 B2 | 9/2013 | Zhu et al. |
| 8,527,345 B2 | 9/2013 | Rothsch et al. |
| 8,554,627 B2 | 10/2013 | Svendsen et al. |
| 8,560,612 B2 | 10/2013 | Kilmer et al. |
| 8,564,710 B2 | 10/2013 | Nonaka et al. |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo |
| 8,676,623 B2 | 3/2014 | Gale et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,933,966 B2 | 1/2015 | Oi et al. |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,031,283 B2 | 5/2015 | Arth et al. |
| 9,040,574 B2 | 5/2015 | Wang et al. |
| 9,055,416 B2 | 6/2015 | Rosen et al. |
| 9,058,687 B2 | 6/2015 | Kruglick |
| 9,083,770 B1 | 7/2015 | Drose et al. |
| 9,094,137 B1 | 7/2015 | Sehn et al. |
| 9,098,926 B2 | 8/2015 | Quan et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,129,432 B2 | 9/2015 | Quan et al. |
| 9,143,382 B2 | 9/2015 | Bhogal et al. |
| 9,143,681 B2 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,240,074 B2 | 1/2016 | Berkovich et al. |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,317,133 B2 | 4/2016 | Korah et al. |
| 9,317,921 B2 | 4/2016 | Chao et al. |
| 9,344,606 B2 | 5/2016 | Hartley et al. |
| 9,355,123 B2 | 5/2016 | Wnuk et al. |
| 9,361,283 B2 | 6/2016 | Jones et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,465,816 B2 | 10/2016 | Johnson et al. |
| 9,477,368 B1 | 10/2016 | Filip et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,495,783 B1 | 11/2016 | Samarasekera et al. |
| 9,498,720 B2 | 11/2016 | Geisner et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,785,796 B1 | 10/2017 | Murphy et al. |
| 9,825,898 B2 | 11/2017 | Sehn |
| 9,836,890 B2 | 12/2017 | Jurgenson et al. |
| 9,854,219 B2 | 12/2017 | Sehn |
| 9,922,431 B2 | 3/2018 | Gray et al. |
| 9,961,520 B2 | 5/2018 | Brooks et al. |
| 9,965,895 B1 | 5/2018 | Gray |
| 10,102,680 B2 | 10/2018 | Jurgenson et al. |
| 10,319,149 B1 | 6/2019 | Cowburn et al. |
| 10,387,730 B1 | 8/2019 | Cowburn et al. |
| 10,497,158 B2 | 12/2019 | Jain et al. |
| 10,657,596 B1 * | 5/2020 | Chavez .................. G06T 11/60 |
| 10,740,974 B1 | 8/2020 | Cawburn et al. |
| 10,984,284 B1 | 4/2021 | Corcoran et al. |
| 10,997,760 B2 | 5/2021 | Berger et al. |
| 11,195,018 B1 | 12/2021 | Cowburn et al. |
| 11,335,067 B2 | 5/2022 | Cowburn et al. |
| 11,450,050 B2 | 9/2022 | Berger et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prakupets et al. |
| 2003/0037124 A1 | 2/2003 | Yamaura et al. |
| 2003/0040899 A1 | 2/2003 | Ogilvie |
| 2003/0052925 A1 | 3/2003 | Daimon et al. |
| 2003/0101044 A1 | 5/2003 | Krasnov |
| 2003/0101230 A1 | 5/2003 | Benschoter et al. |
| 2003/0110503 A1 | 6/2003 | Perkes |
| 2003/0126215 A1 | 7/2003 | Udell |
| 2003/0133041 A1 | 7/2003 | Curtis et al. |
| 2003/0148773 A1 | 8/2003 | Spriestersbach et al. |
| 2003/0164856 A1 | 9/2003 | Prager et al. |
| 2003/0217106 A1 | 11/2003 | Adar et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0095357 A1 | 5/2004 | Oh et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |

(56) References Cited

U.S. PATENT DOCUMENTS

| | | |
|---|---|---|
| 2005/0048989 A1 | 3/2005 | Jung |
| 2005/0052339 A1 | 3/2005 | Sprague |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0001758 A1 | 1/2006 | Nam et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Fiynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1* | 3/2008 | Lemay .............. H04M 1/72436 345/169 |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008371 A1 | 4/2009 | Wood et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collison |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand. et al. |
| 2009/0291672 A1 | 11/2009 | Treves et al. |
| 2009/0292608 A1 | 11/2009 | Polachek |
| 2009/0293012 A1 | 11/2009 | Alter et al. |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |

(56) References Cited

U.S. PATENT DOCUMENTS

| | | |
|---|---|---|
| 2010/0273509 A1 | 10/2010 | Sweeney et al. |
| 2010/0281045 A1 | 11/2010 | Dean |
| 2010/0287485 A1 | 11/2010 | Bertolami et al. |
| 2010/0306669 A1 | 12/2010 | Delia |
| 2010/0315418 A1 | 12/2010 | Woo |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0096093 A1 | 4/2011 | Oi et al. |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0270584 A1 | 11/2011 | Plocher et al. |
| 2011/0273575 A1 | 11/2011 | Lee |
| 2011/0279445 A1 | 11/2011 | Murphy et al. |
| 2011/0279446 A1 | 11/2011 | Castro et al. |
| 2011/0279453 A1 | 11/2011 | Murphy et al. |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0041722 A1 | 2/2012 | Quan et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0069233 A1 | 3/2012 | Nonaka et al. |
| 2012/0084731 A1 | 4/2012 | Filman et al. |
| 2012/0084835 A1 | 4/2012 | Thomas et al. |
| 2012/0086727 A1 | 4/2012 | Korah et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0001651 A1 | 6/2012 | Lalancette |
| 2012/0143760 A1 | 6/2012 | Abulafia et al. |
| 2012/0146991 A1 | 6/2012 | Bala et al. |
| 2012/0150978 A1 | 6/2012 | Monaco |
| 2012/0166971 A1 | 6/2012 | Sachsen et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0181330 A1 | 7/2012 | Kim |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212509 A1 | 8/2012 | Benko et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0240077 A1 | 9/2012 | Vaittinen et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormaid et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0060911 A1 | 3/2013 | Nagaraj et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0141419 A1 | 6/2013 | Mount et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0181971 A1 | 7/2013 | Mueller |
| 2013/0182133 A1 | 7/2013 | Tanabe |
| 2013/0185131 A1 | 7/2013 | Sinha et al. |
| 2013/0187952 A1 | 7/2013 | Berkovich et al. |
| 2013/0191198 A1 | 7/2013 | Carlson et al. |
| 2013/0194164 A1 | 8/2013 | Sugden et al. |
| 2013/0194301 A1 | 8/2013 | Robbins et al. |
| 2013/0198176 A1 | 8/2013 | Kim |
| 2013/0215101 A1 | 8/2013 | Duan |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |

(56) References Cited

U.S. PATENT DOCUMENTS

| | | |
|---|---|---|
| 2013/0304646 A1 | 11/2013 | De Geer |
| 2013/0308822 A1 | 11/2013 | Marimon et al. |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0064624 A1 | 3/2014 | Kim et al. |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0193047 A1* | 7/2014 | Grosz ............... G06Q 10/10 382/118 |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0232743 A1 | 8/2014 | Na et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein |
| 2014/0287779 A1 | 9/2014 | O'keefe et al. |
| 2014/0289833 A1 | 9/2014 | Briceno |
| 2014/0301645 A1 | 10/2014 | Mattila |
| 2014/0306986 A1 | 10/2014 | Gottesman |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0002506 A1 | 1/2015 | Saarimäki et al. |
| 2015/0020086 A1 | 1/2015 | Chen et al. |
| 2015/0040074 A1* | 2/2015 | Hofmann ............ G06T 19/006 715/852 |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0092038 A1 | 4/2015 | Jantunen |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178257 A1 | 6/2015 | Jones et al. |
| 2015/0178260 A1 | 6/2015 | Brunson |
| 2015/0193982 A1 | 7/2015 | Mihelich et al. |
| 2015/0199082 A1 | 7/2015 | Scholler et al. |
| 2015/0222814 A1 | 8/2015 | Li et al. |
| 2015/0227602 A1 | 8/2015 | Ramu et al. |
| 2015/0261917 A1 | 9/2015 | Smith |
| 2015/0294503 A1 | 10/2015 | Yang et al. |
| 2015/0312184 A1 | 10/2015 | Langholz et al. |
| 2015/0347854 A1 | 12/2015 | Bare et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0019270 A1 | 1/2016 | Jones et al. |
| 2016/0085773 A1 | 3/2016 | Chang et al. |
| 2016/0085863 A1 | 3/2016 | Allen et al. |
| 2016/0086384 A1 | 3/2016 | Stroila |
| 2016/0086670 A1 | 3/2016 | Gross et al. |
| 2016/0099901 A1 | 4/2016 | Allen et al. |
| 2016/0104452 A1 | 4/2016 | Guan et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0203586 A1 | 7/2016 | Chang et al. |
| 2016/0225164 A1 | 8/2016 | Tomlin et al. |
| 2016/0239248 A1 | 8/2016 | Sehn |
| 2016/0253710 A1 | 9/2016 | Publicover et al. |
| 2016/0266386 A1 | 9/2016 | Scott et al. |
| 2016/0277419 A1 | 9/2016 | Allen et al. |
| 2016/0321708 A1 | 11/2016 | Sehn |
| 2016/0352791 A1 | 12/2016 | Adams et al. |
| 2016/0359957 A1 | 12/2016 | Laliberte |
| 2016/0359987 A1 | 12/2016 | Laliberte |
| 2016/0371884 A1 | 12/2016 | Benko et al. |
| 2017/0006094 A1 | 1/2017 | Abou Mahmoud et al. |
| 2017/0061308 A1 | 3/2017 | Chen et al. |
| 2017/0124713 A1 | 5/2017 | Jurgenson et al. |
| 2017/0161382 A1 | 6/2017 | Ouimet et al. |
| 2017/0161558 A1 | 6/2017 | Ludwigsen et al. |
| 2017/0228878 A1 | 8/2017 | Goldman et al. |
| 2017/0237789 A1 | 8/2017 | Harner et al. |
| 2017/0243371 A1 | 8/2017 | Jurgenson et al. |
| 2017/0263029 A1 | 9/2017 | Yan et al. |
| 2017/0287006 A1 | 10/2017 | Azmoodeh et al. |
| 2017/0289623 A1* | 10/2017 | Bailey ............... H04N 21/475 |
| 2017/0295250 A1 | 10/2017 | Samaranayake et al. |
| 2017/0308272 A1 | 10/2017 | Levien et al. |
| 2017/0372526 A1 | 12/2017 | Groten et al. |
| 2017/0374003 A1 | 12/2017 | Allen et al. |
| 2017/0374508 A1 | 12/2017 | Davis et al. |
| 2018/0061127 A1 | 3/2018 | Gullicksen |
| 2018/0089904 A1 | 3/2018 | Jurgenson et al. |
| 2018/0096502 A1 | 4/2018 | Kansara |
| 2018/0144524 A1 | 5/2018 | Lotto et al. |
| 2018/0189552 A1 | 7/2018 | Barnett et al. |
| 2018/0204372 A1 | 7/2018 | Sudheendra et al. |
| 2019/0073832 A1 | 3/2019 | Kim |
| 2019/0156534 A1 | 5/2019 | Chen et al. |
| 2019/0347323 A1 | 11/2019 | Riesa et al. |
| 2020/0058151 A1* | 2/2020 | Stukalov ............... G06T 13/00 |
| 2020/0074705 A1 | 3/2020 | Berger et al. |
| 2020/0250889 A1 | 8/2020 | Li |
| 2021/0056760 A1 | 2/2021 | Cowburn et al. |
| 2021/0166455 A1 | 6/2021 | Berger et al. |
| 2022/0076017 A1 | 3/2022 | Cowburn et al. |

FOREIGN PATENT DOCUMENTS

| | | |
|---|---|---|
| CN | 113396443 A | 9/2021 |
| EP | 2051480 A1 | 4/2009 |
| EP | 2151797 A1 | 2/2010 |
| GB | 2399928 A | 9/2004 |
| KR | 19990073076 A | 10/1999 |
| KR | 20010078417 A | 8/2001 |
| KR | 20150107063 A | 9/2015 |
| KR | 20170018930 A | 2/2017 |
| KR | 20180087918 A | 8/2018 |
| WO | WO-1996024213 A1 | 8/1996 |
| WO | WO-1999063453 A1 | 12/1999 |

(56) References Cited

FOREIGN PATENT DOCUMENTS

| WO | WO-2000058882 A1 | 10/2000 |
|---|---|---|
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2013008238 A1 | 1/2013 |
| WO | WO-2013008251 A2 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016149594 A1 | 9/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | WO-2020047259 A1 | 3/2020 |
| WO | WO-2020160261 A1 | 8/2020 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 14/954,090, Corrected Notice of Allowance dated Feb. 3, 2017", 4 pgs.

"U.S. Appl. No. 14/954,090, Corrected Notice of Allowance dated Apr. 18, 2017", 4 pgs.

"U.S. Appl. No. 14/954,090, Notice of Allowance dated Jan. 11, 2017", 11 pgs.

"U.S. Appl. No. 14/954,090, Preliminary Amendment filed Dec. 28, 2016", 10 pgs.

"U.S. Appl. No. 15/436,363, Examiner Interview Summary dated Nov. 28, 2018", 3 pgs.

"U.S. Appl. No. 15/436,363, Non Final Office Action dated Oct. 9, 2018", 15 pgs.

"U.S. Appl. No. 15/436,363, Notice of Allowance dated Jan. 29, 2019", 8 pgs.

"U.S. Appl. No. 15/436,363, Response filed Nov. 28, 2018 to Non Final Office Action dated Oct. 9, 2018", 15 pgs.

"U.S. Appl. No. 15/492,089, Corrected Notice of Allowability dated May 24, 2019", 2 pgs.

"U.S. Appl. No. 15/492,089, Non Final Office Action dated Jan. 25, 2019", 7 pgs.

"U.S. Appl. No. 15/492,089, Notice of Allowance dated Apr. 4, 2019", 9 pgs.

"U.S. Appl. No. 15/492,089, Response filed Feb. 26, 2019 to Non Final Office Action dated Jan. 25, 2019", 11 pgs.

"U.S. Appl. No. 15/591,887, Corrected Notice of Allowance dated Sep. 8, 2017", 4 pgs.

"U.S. Appl. No. 15/591,887, Notice of Allowance dated Aug. 25, 2017", 10 pgs.

"U.S. Appl. No. 15/591,887, Preliminary Amendment filed Jun. 12, 2017", 10 pgs.

"U.S. Appl. No. 15/591,887, PTO Response to Rule 312 Communication dated Sep. 19, 2017", 2 pgs.

"U.S. Appl. No. 15/706,074, Examiner Interview Summary dated Feb. 5, 2020", 3 pgs.

"U.S. Appl. No. 15/706,074, Examiner Interview Summary dated Jul. 3, 2019", 3 pgs.

"U.S. Appl. No. 15/706,074, Examiner Interview Summary dated Nov. 1, 2019", 3 pgs.

"U.S. Appl. No. 15/706,074, Final Office Action dated May 10, 2019", 28 pgs.

"U.S. Appl. No. 15/706,074, Final Office Action dated Dec. 19, 2019", 32 pgs.

"U.S. Appl. No. 15/706,074, Non Final Office Action dated Sep. 18, 2019", 29 pgs.

"U.S. Appl. No. 15/706,074, Non Final Office Action dated Nov. 7, 2018", 26 pgs.

"U.S. Appl. No. 15/706,074, Notice of Allowance dated Mar. 30, 2020", 5 pgs.

"U.S. Appl. No. 15/706,074, Response filed Mar. 19, 2020 to Final Office Action dated Dec. 19, 2019", 12 pgs.

"U.S. Appl. No. 15/706,074, Response filed Mar. 28, 2019 to Non Final Office Action dated Nov. 7, 2018", 14 pgs.

"U.S. Appl. No. 15/706,074, Response filed Jul. 8, 2019 to Final Office Action dated May 10, 2019", 17 pgs.

"U.S. Appl. No. 15/706,074, Response filed Nov. 11, 2019 to Non Final Office Action dated Sep. 18, 2019", 13 pgs.

"U.S. Appl. No. 15/830,965, Corrected Notice of Allowability dated Aug. 6, 2018", 4 pgs.

"U.S. Appl. No. 15/830,965, Non Final Office Action dated Feb. 16, 2018", 7 pgs.

"U.S. Appl. No. 15/830,965, Notice of Allowability dated Jul. 5, 2018", 5 pgs.

"U.S. Appl. No. 15/830,965, Notice of Allowance dated Jun. 13, 2018", 8 pgs.

"U.S. Appl. No. 15/830,965, Response filed May 16, 2018 to Non Final Office Action dated Feb. 16, 2018", 10 pgs.

"U.S. Appl. No. 16/119,397, Final Office Action dated May 21, 2020", 17 pgs.

"U.S. Appl. No. 16/119,397, Final Office Action dated Aug. 21, 2020", 18 pgs.

"U.S. Appl. No. 16/119,397, Non Final Office Action dated Jun. 19, 2020", 17 pgs.

"U.S. Appl. No. 16/119,397, Non Final Office Action dated Oct. 1, 2020", 18 pgs.

"U.S. Appl. No. 16/119,397, Non Final Office Action dated Nov. 15, 2019", 14 pgs.

"U.S. Appl. No. 16/119,397, Notice of Allowance dated Dec. 28, 2020", 9 pgs.

"U.S. Appl. No. 16/119,397, Response filed Feb. 18, 2020 to Non Final Office Action dated Nov. 15, 2019", 12 pgs.

"U.S. Appl. No. 16/119,397, Response filed May 29, 2020 to Final Office Action dated May 21, 2020", 12 pgs.

"U.S. Appl. No. 16/119,397, Response filed Jul. 14, 2020 to Non Final Office Action dated Jun. 19, 2020", 12 pgs.

"U.S. Appl. No. 16/119,397, Response filed Sep. 2, 2020 to Final Office Action dated Aug. 21, 2020", 12 pgs.

"U.S. Appl. No. 16/119,397, Response filed Nov. 16, 2020 to Non Final Office Action dated Oct. 1, 2020", 13 pgs.

"U.S. Appl. No. 16/135,849, Preliminary Amendment filed Oct. 15, 2018", 10 pgs.

"U.S. Appl. No. 16/136,849, Non Final Office Action dated Oct. 17, 2018", 4 pgs.

"U.S. Appl. No. 16/136,849, Response filed Jan. 17, 2019 to Non Final Office Action dated Oct. 17, 2018", 9 pgs.

"U.S. Appl. No. 16/265,382, Advisory Action dated Jan. 12, 2022", 4 pgs.

"U.S. Appl. No. 16/265,382, Final Office Action dated Oct. 13, 2020", 21 pgs.

"U.S. Appl. No. 16/265,382, Final Office Action dated Oct. 18, 2022", 24 pgs.

"U.S. Appl. No. 16/265,382, Final Office Action dated Oct. 29, 2021", 22 pgs.

"U.S. Appl. No. 16/265,382, Non Final Office Action dated Mar. 3, 2020", 18 pgs.

(56) References Cited

OTHER PUBLICATIONS

"U.S. Appl. No. 16/265,382, Non Final Office Action dated May 24, 2021", 23 pgs.
"U.S. Appl. No. 16/265,382, Non Final Office Action dated Jun. 3, 2022", 24 pgs.
"U.S. Appl. No. 16/265,382, Response filed Feb. 12, 2021 to Final Office Action dated Oct. 13, 2020", 11 pgs.
"U.S. Appl. No. 16/265,382, Response filed Mar. 29, 2022 to Advisory Action dated Jan. 12, 2022", 11 pgs.
"U.S. Appl. No. 16/265,382, Response filed Aug. 3, 2020 to Non Final Office Action dated Mar. 3, 2020", 10 pgs.
"U.S. Appl. No. 16/265,382, Response filed Sep. 24, 2021 to Non Final Office Action dated May 24, 2021", 11 pgs.
"U.S. Appl. No. 16/265,382, Response filed Oct. 3, 2022 to Non Final Office Action dated Jun. 3, 2022", 11 pgs.
"U.S. Appl. No. 16/265,382, Response filed Dec. 29, 2021 to Final Office Action dated Oct. 29, 2021", 11 pgs.
"U.S. Appl. No. 16/277,626, Examiner Interview Summary dated Apr. 7, 2020", 3 pgs.
"U.S. Appl. No. 16/277,626, Final Office Action dated Feb. 22, 2021", 18 pgs.
"U.S. Appl. No. 16/277,626, Final Office Action dated Apr. 15, 2022", 23 pgs.
"U.S. Appl. No. 16/277,626, Final Office Action dated May 18, 2020", 30 pgs.
"U.S. Appl. No. 16/277,626, Final Office Action dated Aug. 10, 2020", 35 pgs.
"U.S. Appl. No. 16/277,626, Final Office Action dated Aug. 20, 2021", 24 pgs.
"U.S. Appl. No. 16/277,626, Non Final Office Action dated Mar. 24, 2020", 28 pgs.
"U.S. Appl. No. 16/277,626, Non Final Office Action dated Jul. 12, 2021", 20 pgs.
"U.S. Appl. No. 16/277,626, Non Final Office Action dated Jul. 13, 2020", 34 pgs.
"U.S. Appl. No. 16/277,626, Non Final Office Action dated Nov. 29, 2021", 19 pgs.
"U.S. Appl. No. 16/277,626, Non Final Office Action dated Nov. 30, 2020", 19 pgs.
"U.S. Appl. No. 16/277,626, Response filed Jan. 28, 2021 to Non Final Office Action dated Nov. 30, 2020", 9 pgs.
"U.S. Appl. No. 16/277,626, Response filed Mar. 29, 2022 to Non Final Office Action dated Nov. 29, 2021", 9 pgs.
"U.S. Appl. No. 16/277,626, Response filed Apr. 28, 2020 to Non Final Office Action dated Mar. 24, 2020", 12 pgs.
"U.S. Appl. No. 16/277,626, Response filed May 11, 2021 to Final Office Action dated Feb. 22, 2021", 10 pgs.
"U.S. Appl. No. 16/277,626, Response filed May 13, 2022 to Final Office Action dated Apr. 15, 2022", 10 pgs.
"U.S. Appl. No. 16/277,626. Response filed May 29, 2020 to Final Office Action dated May 18, 2020", 12 pgs.
"U.S. Appl. No. 16/277,626, Response filed Jul. 16, 2020 to Non Final Office Action dated Jul. 13, 2020", 10 pgs.
"U.S. Appl. No. 16/277,626, Response filed Aug. 10, 2021 to Non Final Office Action dated Jul. 12, 2021", 9 pgs.
"U.S. Appl. No. 16/277,626. Response filed Aug. 19, 2020 to Final Office Action dated Aug. 10, 2020", 10 pgs.
"U.S. Appl. No. 16/277,626, Response filed Oct. 21, 2021 to Final Office Action dated Aug. 20, 2021", 11 pgs.
"U.S. Appl. No. 16/433,793, Final Office Action dated Apr. 30, 2021", 9 pgs.
"U.S. Appl. No. 16/433,793, Non Final Office Action dated Jan. 21, 2021", 26 pgs.
"U.S. Appl. No. 16/433,793, Notice of Allowance dated Aug. 6, 2021", 14 pgs.
"U.S. Appl. No. 16/433,793, Response filed Apr. 21, 2021 to Non Final Office Action dated Jan. 21, 2021", 12 pgs.
"U.S. Appl. No. 16/433,793, Response filed Jun. 30, 2021 to Final Office Action dated Apr. 30, 2021", 9 pgs.

"U.S. Appl. No. 16/921,487, Corrected Notice of Allowability dated Feb. 1, 2022", 2 pgs.
"U.S. Appl. No. 16/921,487, Final Office Action dated Oct. 15, 2021", 22 pgs.
"U.S. Appl. No. 16/921,487, Non Final Office Action dated Jun. 10, 2021", 19 pgs.
"U.S. Appl. No. 16/921,487, Notice of Allowance dated Jan. 12, 2022", 5 pgs.
"U.S. Appl. No. 16/921,487, Preliminary Amendment filed Nov. 16, 2020", 8 pgs.
"U.S. Appl. No. 16/921,487, Response filed Sep. 10, 2021 to Non Final Office Action dated Jun. 10, 2021", 12 pgs.
"U.S. Appl. No. 16/921,487, Response filed Dec. 15, 2021 to Final Office Action dated Oct. 15, 2021", 12 pgs.
"U.S. Appl. No. 17/248,835, Final Office Action dated Jan. 31, 2022", 18 pgs.
"U.S. Appl. No. 17/248,835, Non Final Office Action dated Oct. 1, 2021", 18 pgs.
"U.S. Appl. No. 17/248,835, Notice of Allowance dated May 17, 2022", 9 pgs.
"U.S. Appl. No. 17/248,835, Response filed Apr. 27, 2022 to Final Office Action dated Jan. 31, 2022", 11 pgs.
"U.S. Appl. No. 17/248,835, Response filed Nov. 29, 2021 to Non Final Office Action dated Oct. 1, 2021", 12 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"Deltatre and Vizrt expanding partnership for Magma Pro Football solution", Vizrt, [Online] Retrieved from the Internet: <URL: http://www.vizrt.com/news/newsgrid/39609/deltatre_and_Vizrt_expanding_partnership_for_Magma_Pro_Football_solutions>, (2013), 5 pgs.
"European Application Serial No. 19854093.2, Extended European Search Report dated Sep. 27, 2021", 7 pgs.
"InstaPlace Photo App Tell the Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report dated Sep. 29, 2015", 2 pgs.
"International Application Serial No. PCT/US2019/048817, International Preliminary Report on Patentability dated Mar. 11, 2021", 7 pgs.
"International Application Serial No. PCT/US2019/048817, International Search Report dated Dec. 13, 2019", 3 pgs.
"International Application Serial No. PCT/US2019/048817, Written Opinion dated Dec. 13, 2019", 5 pgs.
"International Application Serial No. PCT/US2020/015868, International Preliminary Report on Patentability dated Aug. 12, 2021", 17 pgs.
"International Application Serial No. PCT/US2020/015868, International Search Report dated Jul. 10, 2020", 6 pgs.
"International Application Serial No. PCT/US2020/015868, Invitation to Pay Additional Fees dated May 19, 2020", 14 pgs.
"International Application Serial No. PCT/US2020/015868, Written Opinion dated Jul. 10, 2020", 15 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2021-7009066, Notice of Preliminary Rejection dated Mar. 14, 2022", w/ English translation, 10 pgs.
"Korean Application Serial No. 10-2021-7027590, Notice of Preliminary Rejection dated Jul. 11, 22", W/Engiish Translation, 11 pgs.

(56) References Cited

OTHER PUBLICATIONS

"Korean Application Serial No. 10-2021-7027590, Response filed Oct. 11, 2022 to Notice of Preliminary Rejection dated Jul. 11, 2022", w/ English Claims, 17 pgs.

"Macy's Believe-o-Magic", [Online] Retrieved from the Internet: <URL: https://web.archive.org/web/20190422101854/https://www.youtube.com/watch?v=xvzRXy3J0Z0&feature-youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Skrite Full Length Commercial", Youtube, [Online] Retrieved from the Internet: <URL: https://www.youtube.com/watch?v=nNx5VeSpk_Y>, (Jun. 27, 2017), 62 pgs.; 1:00 min.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobil Just Won Filters", TechCrunch, [Online] Retrieved from the Internet: <URL: https://techcrunch.com/2011/09/08/mobli-filters>, (Sep. 8, 2011), 10 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Klein, Georg, "Parallel Tracking and Mapping for Small AR Workspaces—Source Code", PTAM Blog, [Online] Retrieved from the Internet on Apr. 3, 2019: <URL: www.robots.ox.ac.uk/~gk/PTAM/, (Feb. 2014), 2 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Maher, Mary Lou, et al., "Designworid: An Augmented 3D Virtual World for Multidisciplinary, Collaborative Design", University of Sydney, Key Centre for Design Computing and Cognition, (2006), 10 pgs.

Melanson, Mike, "This text message will self destruct in 60 seconds", [Online] Retrieved from the Internet: <URL: http://readwrite.com/2011/02/11/this_text_message_will_self_destruct_in_60_seconds, (Feb. 18, 2015), 4 pgs.

Nahar, Prakhar, et al., "Autonomous UAV Forced Graffiti Detection and Removal System Based on Machine Learning", IEEE 2017 SmartWorld/SCALCOM/UIC/ATC/CBDCom/IOP/SCI, (2017), 8 pgs.

Narhare, Ashwini D, et al., "Trademark detection using SIFT features matching", IEEE 2015 International Conference on Computing Communication Control and Automation, (2015), 684-688.

Notopoulos, Katie, "A Guide To The New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Park, Jungsik, et al., "Interactive Deformation of Real Objects", IEEE International Symposium on Mixed and Augmented Reality (ISMAR), Science and Technology Proceedings, Munich, DE, (Sep. 2014), 295-296.

Raskar, Ramesh, et al., "Table-top spatially-augmented realty: bringing physical models to life with projected imagert", Proceedings 2nd IEEE and ACM International Workshop on Augmented Reality (IWAR'99), San Francisco, USA, (Oct. 20-21, 1999), 67-71.

Rosten, Edward, "FAST Corner Detection", Edwardrosten.com, [Online] Retrieved from the Internet on Apr. 3, 2019: <URL: https://www.edwardrosten.com/work/fast.html>, (Feb. 25, 2018), 5 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/> (May 7, 2012), 5 pgs.

Sheikh, Md. Abdul Alim, et al., "Traffic Sign Detection and Classification using Colour Feature and Neural Network", IEEE 2016 International Conference on Intelligent Control Power and Instrumentation (ICICPI), (2016), 307-311.

Shein, Esther, "Ephemeral Data", Communications of the ACM, vol. 56, No. 9, (Sep. 2013), 3 pgs.

Taejin, Ha, et al., "ARtalet: Tangible User Interface Based Immersive Augmented Reality Authoring Tool for Digilog Book", IEEE Computer Society, International Symposium on Ubiquitous Virtual Reality, Gwangju, South Korea, (Jul. 7-10, 2010), 40-43.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

Vaas, Lisa, "StealthText, Should You Choose to Accept It", [Online] Retrieved from the Internet: <URL: http://www.eweek.eom/print/c/a/MessagingandCollaboration/StealthTextShouldYouChoosetoAcceptIt>, (Dec. 13, 2005), 2 pgs.

Wagner, Daniel, et al., "Pose Tracking from Natural Features on Mobile Phones", Proc. of the 7th IEEE/ACM Intl. Symposium on Mixed and Augmented Reality, IEEE Computer Society, (2008), 10 pgs.

U.S. Appl. No. 16/119,397 U.S. Pat. No. 10,997,760, filed Aug. 31, 2018, Augmented Reality Anthropomorphization System.

U.S. Appl. No. 17/248,835 U.S. Pat. No. 11,450,050, filed Feb. 10, 2021, Augmented Reality Anthropomorphization System.

U.S. Appl. No. 16/265,382, filed Feb. 1, 2019, Augmented Reality System.

* cited by examiner

400

CAUSING DISPLAY OF A PRESENTATION OF IMAGE DATA AT A CLIENT DEVICE
402

IDENTIFYING A DISPLAY OF AN OBJECT WITHIN THE PRESENTATION OF THE IMAGE DATA, THE DISPLAY OF THE OBJECT COMPRISING AN OBJECT BOUNDARY
404

DETECTING AN ATTRIBUTE OF THE OBJECT BASED ON THE IMAGE DATA
406

RETRIEVING A MEDIA OBJECT BASED ON THE ATTRIBUTE OF THE OBJECT
408

PRESENTING THE MEDIA OBJECT AT A POSITION WITHIN THE PRESENTATION OF THE IMAGE DATA, THE POSITION BASED ON THE OBJECT BOUNDARY OF THE DISPLAY OF THE OBJECT
410

```
IDENTIFYING A SECOND DISPLAY OF A SECOND OBJECT WITHIN THE
PRESENTATION OF THE IMAGE DATA, THE SECOND DISPLAY COMPRISING
A SECOND OBJECT BOUNDARY
702
```

```
DETECTING A SECOND ATTRIBUTE OF THE SECOND OBJECT IN
RESPONSE TO THE IDENTIFYING THE SECOND DISPLAY OF THE SECOND
OBJECT
704
```

```
ANIMATING THE MEDIA OBJECT BASED ON AT LEAST THE SECOND
ATTRIBUTE OF THE SECOND OBJECT
706
```

IDENTIFYING A SECOND DISPLAY OF A SECOND OBJECT WITHIN THE PRESENTATION OF THE IMAGE DATA, THE SECOND DISPLAY COMPRISING A SECOND OBJECT BOUNDARY
802

DETECTING THE ATTRIBUTE OF THE SECOND OBJECT
804

RETRIEVING A SECOND MEDIA OBJECT BASED ON THE ATTRIBUTE OF THE SECOND OBJECT
806

PRESENTING THE SECOND MEDIA OBJECT AT A SECOND POSITION WITHIN THE PRESENTATION OF THE IMAGE DATA, THE SECOND POSITION BASED ON THE SECOND OBJECT BOUNDARY
808

DETECTING AN INTERACTION BETWEEN THE FIRST OBJECT AND THE SECOND OBJECT
810

ANIMATING THE FIRST MEDIA OBJECT AND THE SECOND MEDIA OBJECT IN RESPONSE TO THE INTERACTION
812

*FIG. 8*

AUGMENTED REALITY ANTHROPOMORPHIZATION SYSTEM

CROSS-REFERENCE TO RELATED APPLICATION

This application is a continuation of U.S. patent application Ser. No. 17/248,835, filed Feb. 10, 2021, which application is a continuation of U.S. patent application Ser. No. 16/119,397, filed Aug. 31, 2018, now issued as U.S. Pat. No. 10,997,760, which are incorporated by reference herein in their entirety.

TECHNICAL FIELD

Embodiments of the present disclosure relate generally to messaging services, and more particularly, to systems for augmenting media content to be distributed in messages.

BACKGROUND

Augmented Reality (AR) is an interactive experience of a real-world environment whereby the objects that reside in the real-world are "augmented" by computer-generated perceptual information, sometimes across multiple sensory modalities, including visual, auditory, haptic, somatosensory, and olfactory. The overlaid sensory information can be constructive (i.e., additive to the natural experience) or destructive (i.e., masking off the natural environment), and is seamlessly interwoven with the physical world such that it is perceived as an immersive aspect of the real environment.

Various technologies are used in AR rendering, including optical projection systems, monitors, handheld devices, and display systems worn on the human body, such as eyeglasses, contact lenses, or a head-up display (HUD).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for presenting AR content, according to certain example embodiments.

FIG. 7 is a flowchart illustrating a method for presenting AR content, according to certain example embodiments.

FIG. 8 is a flowchart illustrating a method for presenting AR content, according to certain example embodiments.

DETAILED DESCRIPTION

Figure 1:
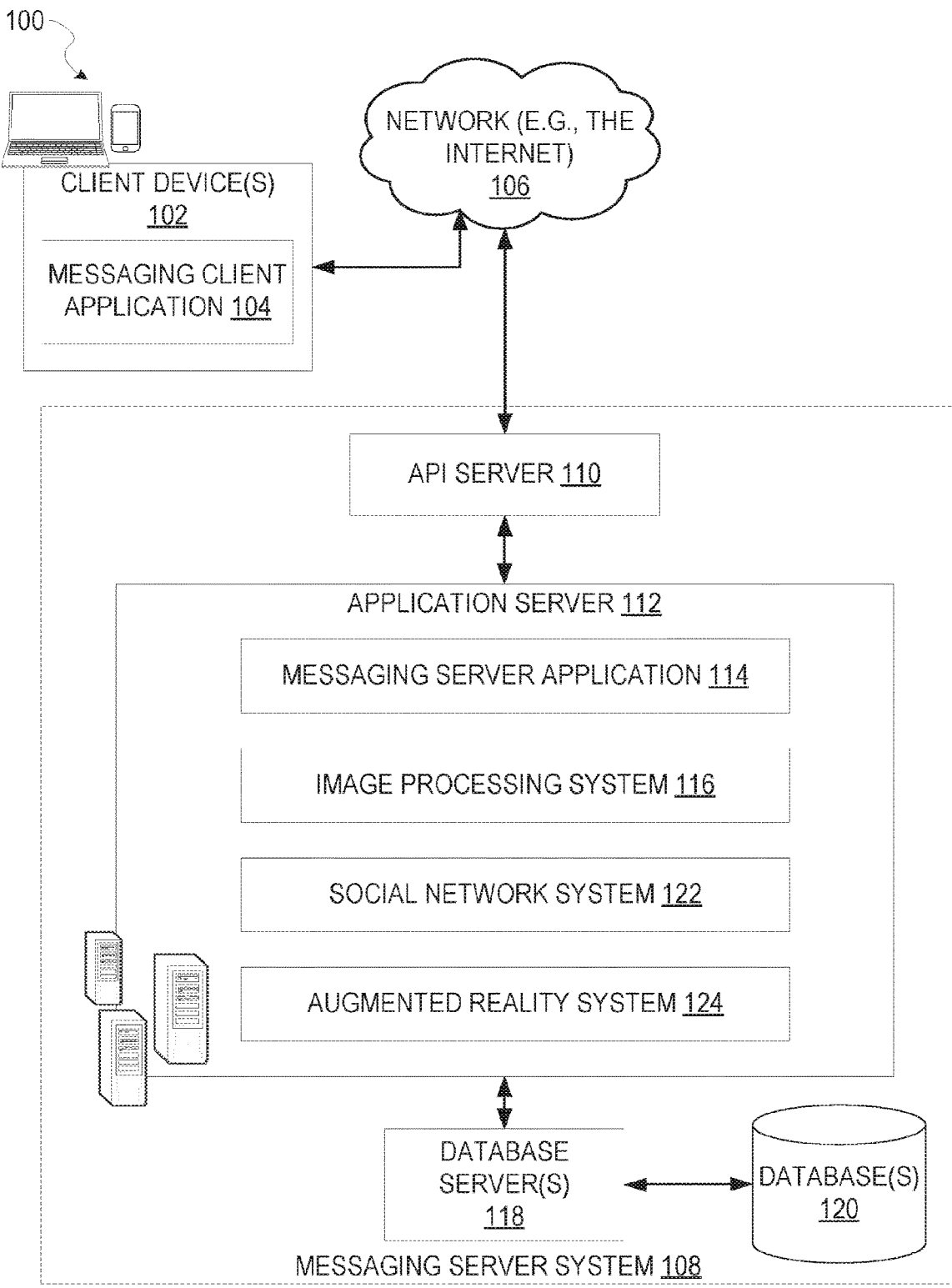
FIG. 1 is a block diagram showing an example messaging system for exchanging data (e.g., messages and associated content) over a network in accordance with some embodiments, wherein the messaging system includes an Augmented Reality (AR) system.

AR systems are used to enhance natural environments or situations and offer perceptually enriched experiences. Embodiments of the present disclosure relate generally to systems for generating and presenting AR content within a graphical user interface (GUI). An AR system causes display of a presentation of image data within a GUI, and identifies one or more objects displayed within the presentation of the image data. For example, the image data may be collected and displayed within the GUI via a camera associated with a client device. The image data may be pre-recorded and accessed at a later time, or in some embodiments may be recorded and displayed in real-time.

In response to detecting the one or more objects within the presentation of the image data, the AR system detects attributes of the one or more objects and retrieves AR media objects to be rendered within the presentation of the image data, based on locations of the one or more identified objects.

In some embodiments, the AR system applies one or more computer vision methods for identifying displays of objects with a presentation of image data. For example, object recognition techniques may be employed to find and identify object in an image or video sequence, including, but not limited to feature-based methods, as well as edge detection. The AR system may for example maintain a database of object features that the AR system may compare to image features of the image data in order to identify objects.

In some embodiments, the AR system associates collections of media objects with object attributes, such that one or more attributes of an identified object (e.g., shape, size, color, text, location, position) may be used to reference and retrieve a media object (e.g., a first media object).

Upon retrieving a media object that corresponds with the identified object within the presentation of the image data, the AR system presents a display of the media object that corresponds with attributes of the identified object at a position within the presentation of the image data, wherein the position is based on a location of the identified object itself. For example, spherical objects may be associated with a first media object (e.g., a smiley face), whereas conical objects may be associated with a second media object (e.g., a frowny face). Upon identifying a basketball (i.e., the round object) within the presentation of the space, the AR system retrieves the first media object, and presents the first media object within the presentation of the image data, at a position based on the location of the basketball, giving the appearance that the basketball has an expressive face. Similarly, upon identifying a traffic-cone, the AR system retrieves the second media object, and presents the second media object at a position within the presentation of the image data based on the location of the traffic-cone.

In some embodiments, aspects of the media object may be altered or adjusted based on the one or more attributes of the object. Aspects may for example include an aspect ratio of the media object, a scale of the media object, a spacing between components of the media object, as well as a size of the media object. In the case of audio features of a media object, aspects of the audio features may be altered or adjusted based on the one or more attributes of the object as well. For example, based on the size and shape of the object, the audio features such as pitch, duration, timbre, sonic texture, and loudness may be adjusted based on the one or more attributes of the object.

In some embodiments, the first media object may be a reactive or interactive media object that dynamically responds to virtual as well as real-world stimuli. Stimuli may include visual, acoustic, thermal, tactile, as well as olfactory events which occur within the presentation of the space. A virtual stimuli may therefore comprise similar events, executed through a first augmented reality media object within the presentation of the space, and directed towards a second augmented reality media object within the presentation of the space. As an illustrative example, the presentation of the space may comprise a display of two separate augmented reality media objects. The media objects may respond to real-world stimuli, such as people or objects within the presentation of the space (e.g., a person picks up or flicks one of the augmented reality media objects), or based on other real-world stimuli such as a loud noise, by performing one or more animations based on attributes of the stimuli. For example, volume of the noise, or speed of motion of a person or object may result in different animations. The media objects may also respond to stimuli between one another. For example, the presence of the second media object may cause the first media object to perform an animation based on attributes of the second media object.

In some embodiments, the media objects may be configurable by a user of a client device. For example, in response to detecting an object within a presentation of a space, the AR system may present a set of configuration options to the user that enable the user to design and configure a media object to be displayed within the presentation of the space, upon the object. In further embodiments, the AR system may receive inputs that assign a set of media object features to one or more attributes of objects presented within the presentation of the space. For example, the user may define that a particular set of media object features should be displayed upon all spherical objects, or all orange, spherical objects.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an AR system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
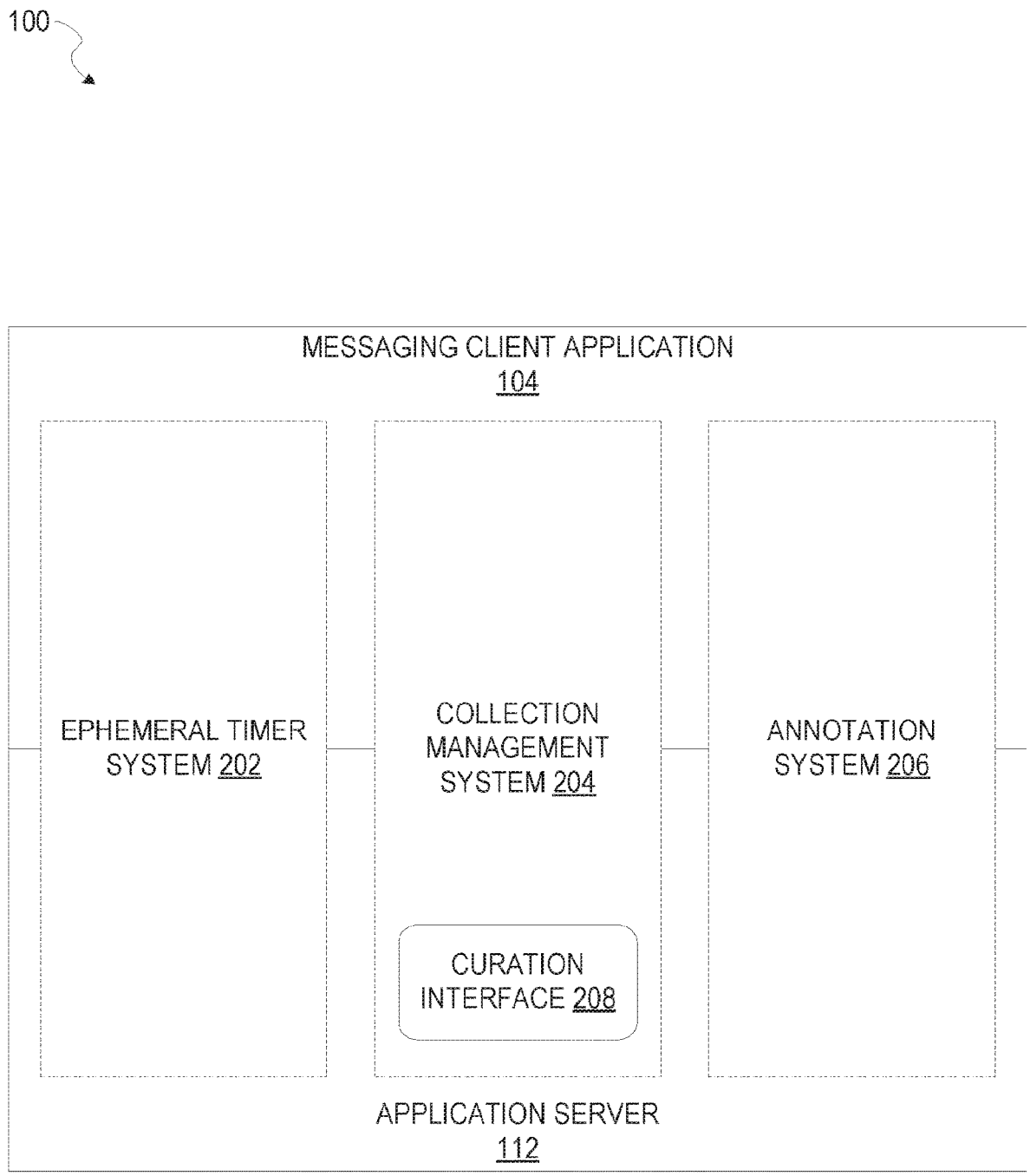
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
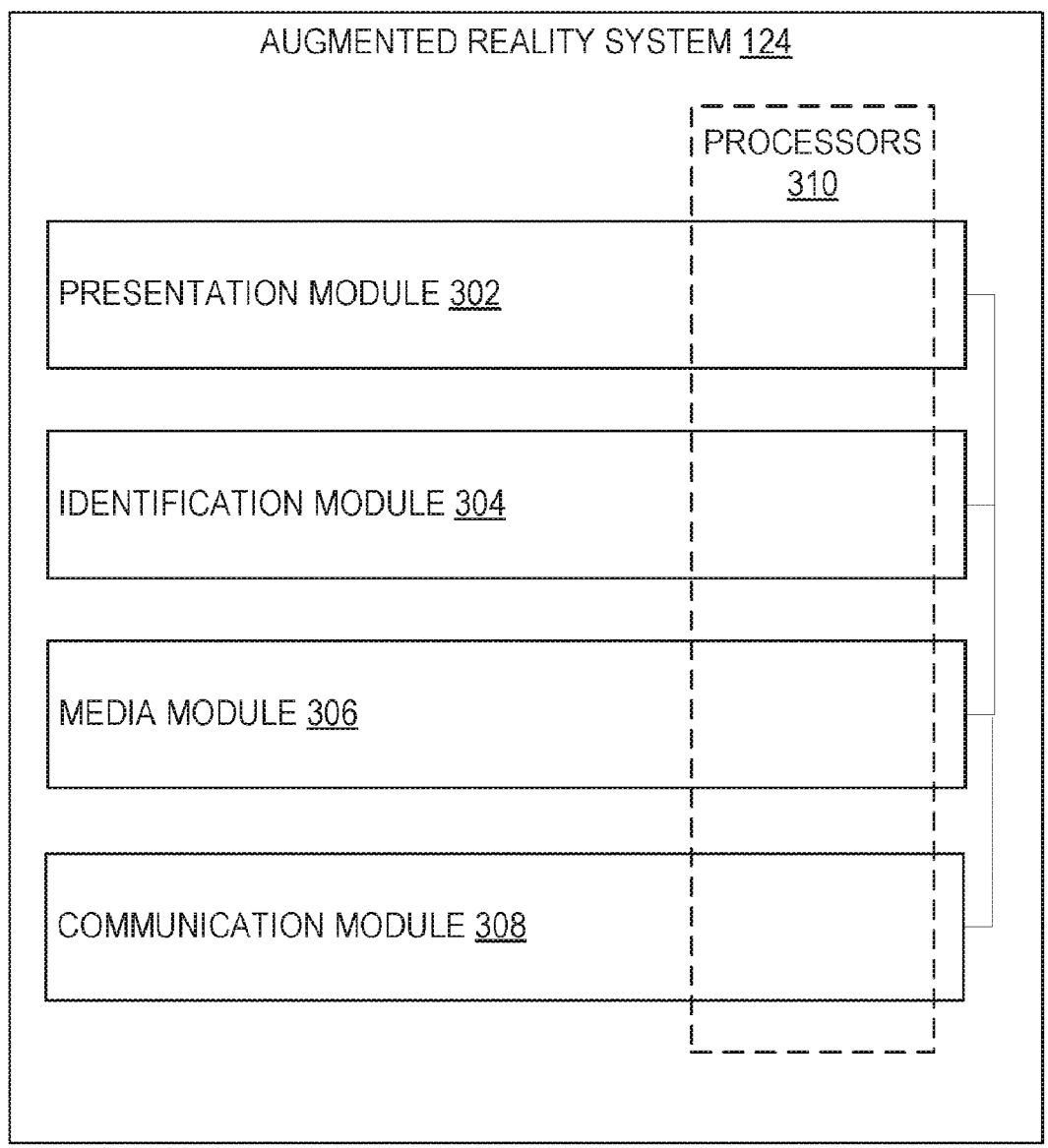
FIG. 3 is a block diagram illustrating various modules of an AR system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the AR system 124 that configure the AR system 124 to: display a presentation of image data at a client device; identify a display of an object within the presentation of the image data based on one or more attributes of the display of the object; detect the one or more attributes of the object; retrieve a media object based on the one or more attributes of the object; and present the media object at a position within the presentation of the image data, wherein the position is based on at least the one or more attributes of the object, according to some example embodiments. The AR system 124 is shown as including a presentation module 302, an identification module 304, a media module 306, and a communication module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the AR system 124 may physically include an arrangement of one or more of the processors 310 (e.g., a subset of or among the one or more processors of the machine) configured to perform the operations described herein for that module. As another example, any module of the AR system 124 may include software, hardware, or both, that configure an arrangement of one or more processors 310 (e.g., among the one or more processors of the machine) to perform the operations described herein for that module. Accordingly, different modules of the AR system 124 may include and configure different arrangements of such processors 310 or a single arrangement of such processors 310 at different points in time. Moreover, any two or more modules of the AR system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for presenting AR content within a presentation of image data at a client device (e.g., client device 102), according to certain example embodiments. Operations of the method 400 may be performed by the modules described above with respect to FIG. 3. As shown in FIG. 4, the method 400 includes one or more operations 402, 404, 406, 408, and 410.

At operation 402, the presentation module 302 causes display of a presentation of image data at a client device 102. The image data may be pre-recorded or in some embodiments may be recorded and presented at the client device 102 in real time. For example, the client device 102 may have a built in camera, or may be linked with a camera (e.g., via Bluetooth).

At operation 404, the identification module 304 identifies a display of an object within the presentation of the image data, wherein the object comprises one or more object attributes and includes an object boundary that defines a size and shape of the object.

In some embodiments, the identification module 304 may apply object recognition techniques to identify object in an image or video sequence, including, but not limited to feature-based methods, as well as edge detection. For example, feature detection includes methods for computing abstractions of image information and making local decisions at every image point whether there is an image feature of a given type at that point or not. The resulting features will be subsets of the image domain, often in the form of isolated points, continuous curves or connected regions. Image features may include edges, corners, blobs, ridges, shapes. The AR system may maintain a database of object features (e.g., database 120), and apply template matching to the image data in order to identify one or more objects displayed within a presentation of the image data based on the object features stored within the database.

In some embodiments, the identification module 304 may receive a user input that selects or otherwise identifies the object within the presentation of the image data. For example, a user may provide a tactile input that comprises an identification of a point within the presentation of the image data. In response to receiving the input that comprises the identification of the point. The identification module 304 identifies the object based on the point identified by the input.

In further embodiments, the identification module 304 may visually guide the user to one or more objects within the presentation of the space. For example, the identification module 304 may identify one or more objects at peripheral locations within the presentation of the space, and in response present directional markers to guide the user to position the one or more objects at a central position within the presentation of the image data.

At operation 406, in response to identifying a display of an object within the presentation of the image data, the identification module 304 detects one or more attributes of the object based on the image data. The attributes may include a size of the object, a shape of the object, a color of the object, a position of the object within the presentation of the space, as well as contextual considerations, such as temporal attributes (e.g., time of day, day of week, season, holiday, etc.), and geo-location attributes.

At operation 408, the media module 306 retrieves or generates a media object based on the one or more attributes of the object, in response to the identification module 304 detecting the one or more attributes of the object. In some embodiments, the AR system 124 may maintain a database of media objects, wherein each media object is associated with one or more object attributes.

At operation 410, the presentation module 302 presents the media object retrieved by the media module 306 at a position within the presentation of the image data at the client device 102, wherein the position of the media object within the presentation of the image data is based on an object attribute that includes at least an object boundary of the display of the object.

Figure 5:
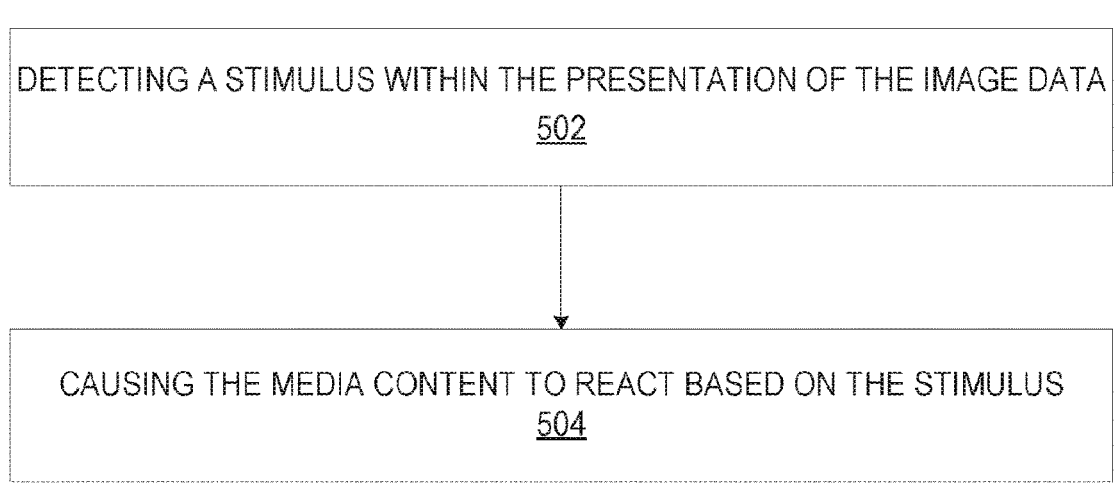
FIG. 5 is a flowchart illustrating a method for presenting AR content, according to certain example embodiments.

FIG. 5 is a flowchart illustrating a method 500 for presenting AR content within a presentation of image data at a client device 102, according to certain example embodiments. Operations of the method 500 may be performed by the modules described above with respect to FIG. 3. As shown in FIG. 5, the method 500 includes one or more operations 502, and 504. In some embodiments, the method 500 may be performed subsequent to operation 410 of the method 400, wherein the media object retrieved by the media module 306 is presented at a position within the presentation of the image data at the client device 102.

At operation 502, the identification module 304 detects a stimulus within the presentation of the image data. The stimulus may include movements detected in an environment depicted by the presentation of the image data.

For example, the identification module 304 may identify and track one or more features from the image data. As discussed above, the features of the image data include individual measurable properties or characteristics that may be observed. The identification module 304 tracks the one or more features within the presentation of the image data, and detects stimulus based on movements of the one or more features. The stimulus comprises attributes, such as a direction, a magnitude, and a type.

In some embodiments, the stimulus may also include auditory stimulus, wherein the auditory stimulus includes sound properties, such as a frequency, an amplitude, a direction or location, and a type.

At operation 504, in response to the identification module 304 detecting the stimulus, the media module 306 causes the media objects displayed within the presentation of the image data (e.g., as in operation 410 of the method 400), to react to the stimulus. In some embodiments, the media module 306 may retrieve animation instructions associated with the media object based on one or more attributes of the stimulus.

In some embodiments, the animation instructions may be hosted within the database 120, such that the identification module 304 may retrieve the animation instructions in response to the detecting the stimulus.

In some embodiments, animation instructions associated with the media object presented within the presentation of the space may be loaded into a memory of the client device 102 in response to the presenting the media object within the presentation of the space.

Figure 6:
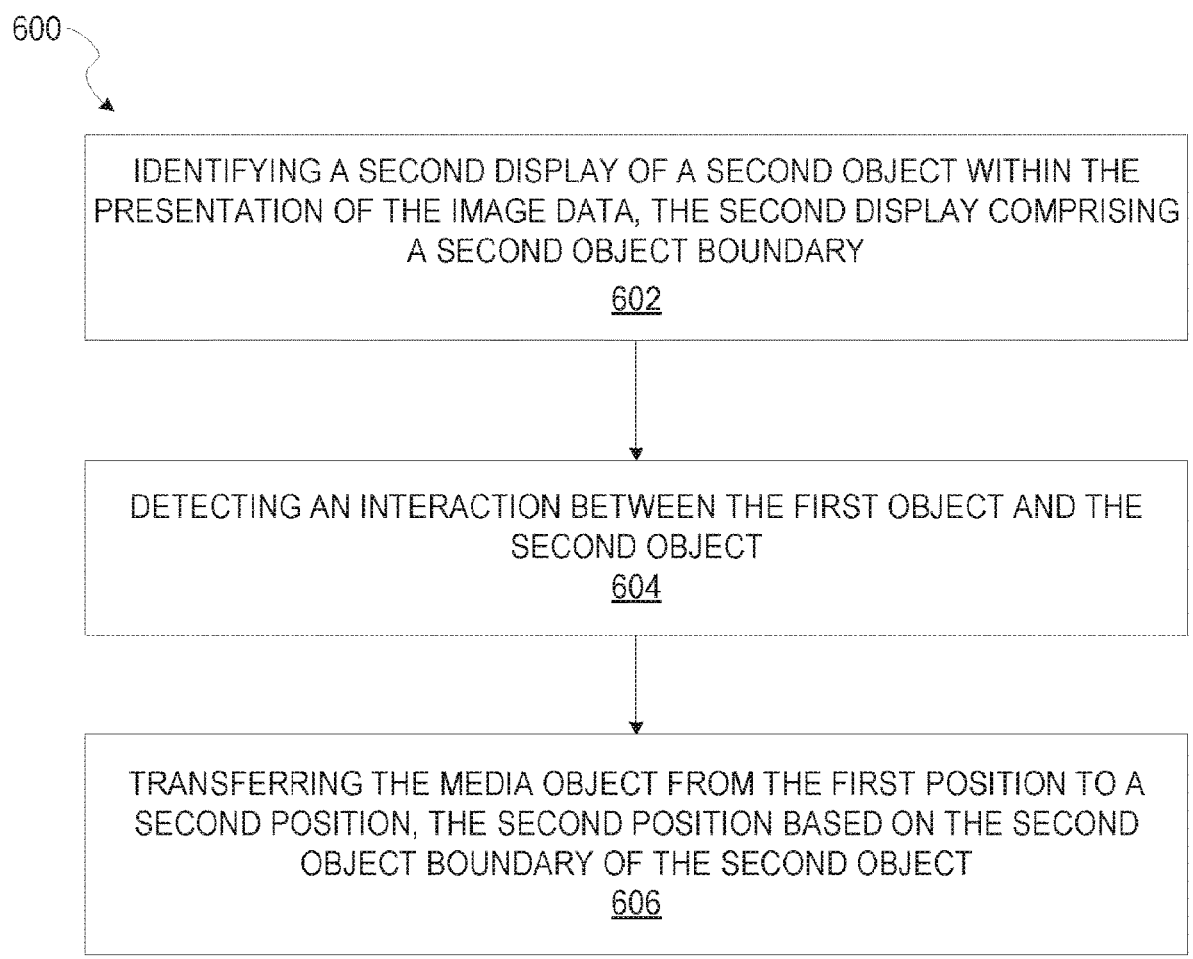
FIG. 6 is a flowchart illustrating a method for presenting AR content, according to certain example embodiments.

FIG. 6 is a flowchart illustrating a method 600 for presenting AR content within a presentation of image data, according to certain example embodiments. Operations of the method 600 may be performed by the modules described above with respect to FIG. 3. As shown in FIG. 6, the method 600 includes one or more operations 602, 604, and 606.

At operation 602, the identification module 304 identifies a display of a second object within the presentation of the image data, wherein the second object comprises a second object boundary that defines a size and shape of the second object.

For example, as in operation 404 of the method 400 where the identification module 304 identifies a display of an object within the presentation of the image data, the identification module 304 may apply object recognition techniques to identify object in an image or video sequence, including, but not limited to feature-based methods, as well as edge detection. For example, feature detection includes methods for computing abstractions of image information and making local decisions at every image point whether there is an image feature of a given type at that point or not. The resulting features will be subsets of the image domain, often in the form of isolated points, continuous curves or connected regions. Image features may include edges, corners, blobs, ridges, shapes. The AR system may maintain a database of object features (e.g., database 120), and apply template matching to the image data in order to identify one or more objects displayed within a presentation of the image data based on the object features stored within the database.

At operation 604, the identification module 304 detects an interaction between the second object and the first object. For example, the identification module 304 may apply various feature tracking techniques to track positions of the first object and the second object within the presentation of the image data. The interaction between the second object and the first object may therefore include a movement of one or both objects towards or away from the other, or may include detecting an overlap of a boundary of the first object with a boundary of the second object.

At operation 606, in response to detecting the interaction between the first object and the second object, the media module 306 transfers a display of the media object from a first position based on the first boundary of the first object, to a second position, wherein the second position is based on a second boundary of the second object.

As an illustrative example, the media object may initially be displayed on a first object within the presentation of the image data, such as an apple. A user may cause the apple to contact with a second object in the presentation of the image data, such as a can of soda, and in response, the media module 306 transfers the display of the media object from the apple to the can of soda within the presentation of the image data.

FIG. 7 is a flowchart illustrating a method 700 for presenting AR content within a presentation of image data, according to certain example embodiments. Operations of the method 700 may be performed by the modules described above with respect to FIG. 3. As shown in FIG. 7, the method 700 includes one or more operations 702, 704, and 706.

At operation 702, the identification module 304 identifies a second display of a second object within the presentation of the image data, wherein the second object comprises a second object boundary that defines a location of the object within the presentation of the space, as well as a size and shape of the object.

At operation 704, the identification module 304 detects one or more attributes of the second object displayed within the presentation of the image data, wherein the one or more attributes include a size, a shape, a location within the presentation of the space, a color, movements of the second object, as well as an object type or category.

At operation 706, the media module 306 causes the media object presented by the presentation module 302 within the presentation of the image data to react to the presence of the second object. For example, the media module 306 may retrieve animation instructions and cause the media object to perform an animation based on the animation instructions.

FIG. 8 is a flowchart illustrating a method 800 for presenting AR content within a presentation of image data, according to certain example embodiments. Operations of the method 800 may be performed by the modules described above with respect to FIG. 3. As shown in FIG. 8, the method 800 includes one or more operations 802, 804, 806, 808, 810, and 812.

At operation 802, the identification module 304 identifies a second display of a second object within the presentation of the image data, wherein the second object comprises a second object boundary that defines a location of the object within the presentation of the space, as well as a size and shape of the object.

At operation 804, the identification module 304 detects one or more attributes of the second object displayed within the presentation of the image data, wherein the one or more attributes include a size, a shape, a location within the presentation of the space, a color, movements of the second object, as well as an object type or category.

At operation 806, the media module 306 retrieves or generates a media object based on the one or more attributes of the object, in response to the identification module 304 detecting the one or more attributes of the object. In some embodiments, the AR system 124 may maintain a database of media objects, wherein each media object is associated with one or more object attributes.

At operation 808, the presentation module 302 presents the media object retrieved by the media module 306 at a position within the presentation of the image data at the client device 102, wherein the position of the media object within the presentation of the image data is based on the second object boundary of the second object.

At operation 810, the identification module 304 detects an interaction between the first object and the second object presented in the presentation of the image data. For example, the interaction may include detecting a movement of the first object or the second object, based on one or more features tracked by the identification module 304.

At operation 812, the media module 306 causes the first media object presented at a position based on the first boundary of the first object and the second media object presented at a position based on the second boundary of the second object, to perform an animation based on the interaction.

Figure 9:
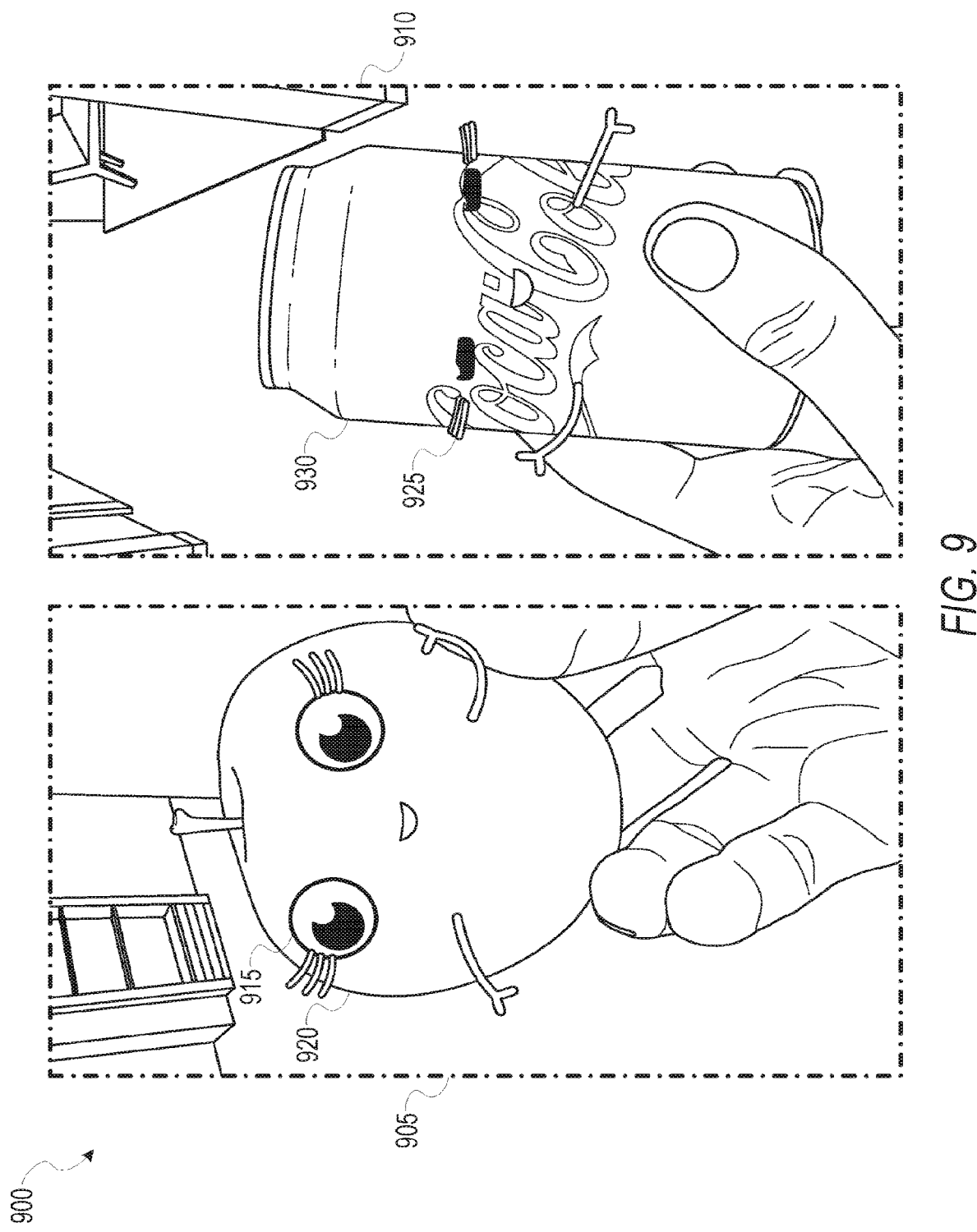
FIG. 9 is an interface diagram depicting AR content presented within a graphical user interface, according to certain example embodiments.

FIG. 9 is an interface diagram 900 depicting AR content (e.g., media objects 915 and 925) presented within a GUI (e.g., GUI 905 and GUI 910), according to certain example embodiments, and as discussed in the method 400 of FIG. 4.

As seen in the GUI 905, the identification module 304 may identify an object 920 within the presentation of the image data displayed within the GUI 905, and based on one or more attributes of the object 920, may cause the media module 306 to retrieve the media object 915. As seen in FIG. 9, the media object 915 may include an AR filter to display interactive anthropomorphic characteristics and features on objects identified by the identification module 304. Similarly, the GUI 910 provide an illustration of an object 930, and a media object 925 retrieved based on one or more attributes of the object 930.

Figure 10:
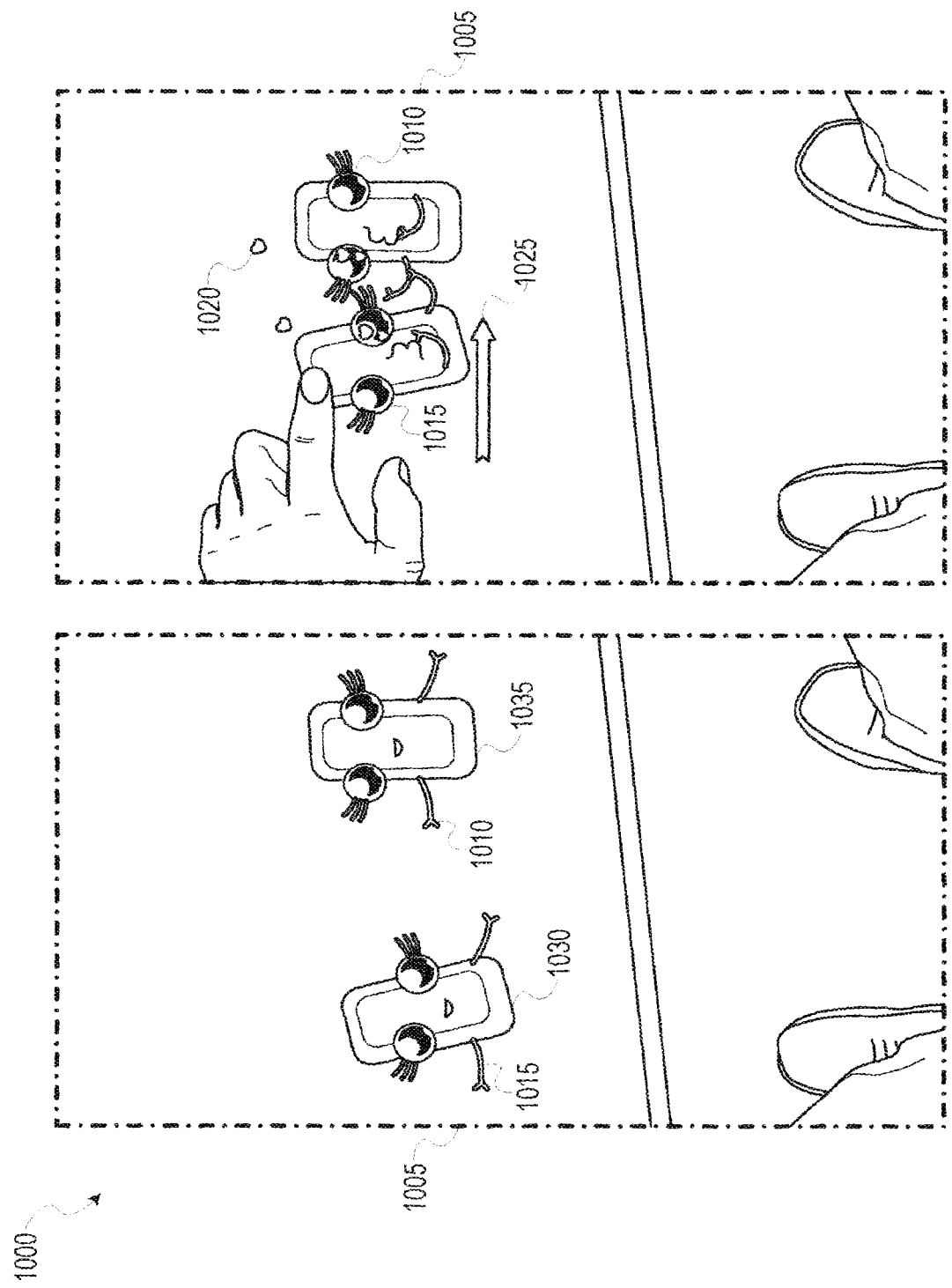
FIG. 10 is an interface diagram depicting AR content presented within a graphical user interface, according to certain example embodiments.

FIG. 10 is an interface diagram 1000 depicting AR content (e.g., media items 1015 and 1010) presented within a GUI 1005, according to certain example embodiments, such as embodiments describes in the method 800 of FIG. 8.

As seen in the interface diagram 1000, the identification module 304 identifies objects 1030 and 1035 within the presentation of the image data displayed within the GUI 1005. Based on attributes of the objects 1030 and 1035, the media module 306 retrieves the media objects 1015 and 1010. As seen in the interface diagram 1000, the media objects 1015 and 1010 include AR filters to display anthropomorphic characteristics and features upon the objects 1030 and 1035.

As discussed in the method 800 of FIG. 8, the identification module 304 may detect an interaction between the objects 1030 and 1035, such as a movement 1025. In response to detecting the interaction, the media module 306 retrieves animation instructions that cause the media objects 1010 and 1015 to perform an animation 1020 based on the animation instructions.

The animation instructions retrieved by the media module 306 may be based on one or more attributes of the interaction.

Figure 11:
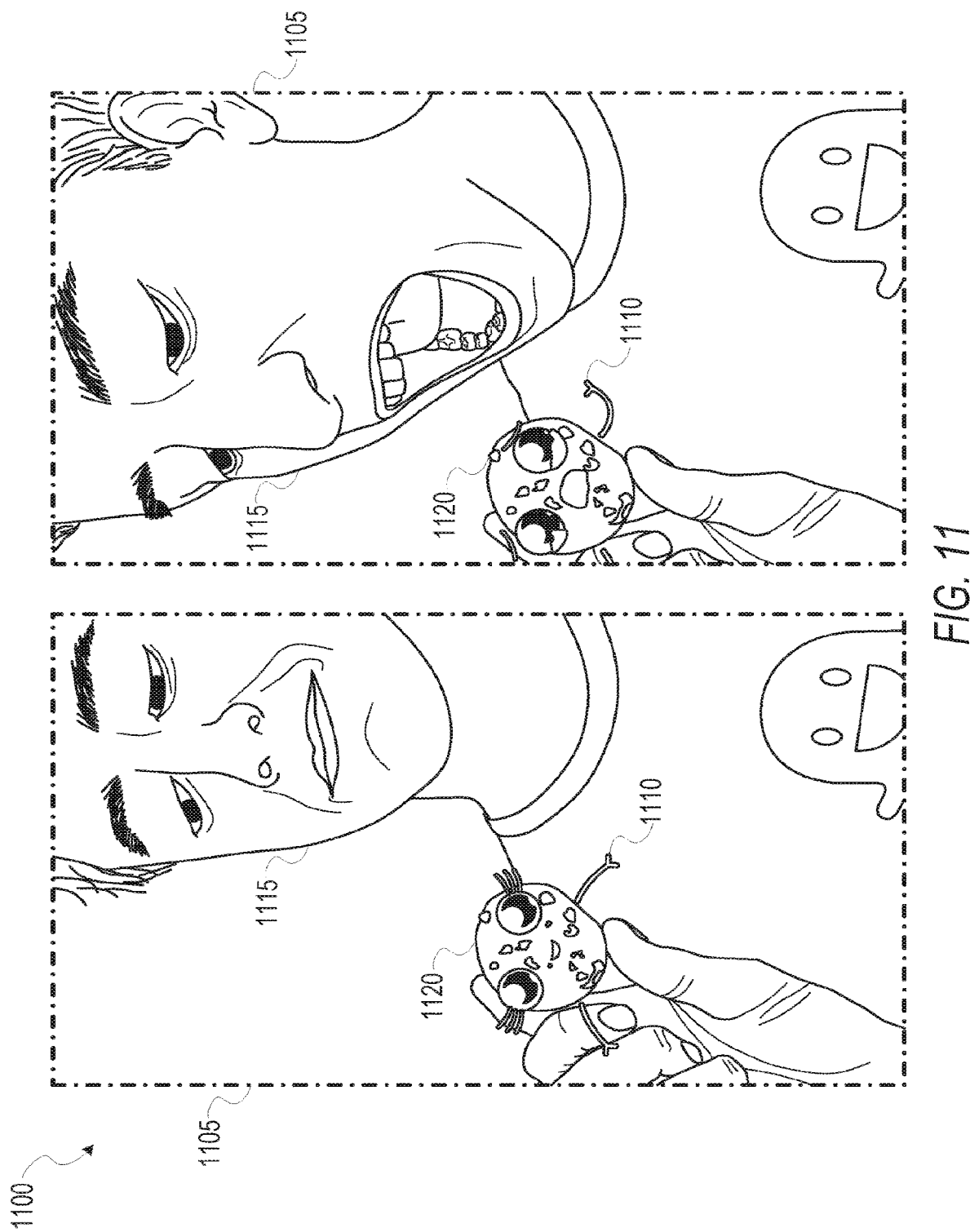
FIG. 11 is an interface diagram depicting AR content presented within a graphical user interface, according to certain example embodiments.

FIG. 11 is an interface diagram 1100 depicting AR content 1110 presented within a GUI 1105, according to certain example embodiments, such as the embodiments discussed in the method 700 of FIG. 7.

As seen in the interface diagram 1100, the identification module 304 identifies an object 1120, and causes the media module 306 to retrieve media content 1110, wherein the media content include an AR filter to display anthropomorphic features upon the object 1120.

In response to detecting a second object 1115, the identification module 304 detects one or more attributes of the second object, and based on the one or more attributes, causes the media module 306 to retrieve animation instructions for the media object 1110 that cause the media object 1110 to perform an animation in response to the second object 1115.

Software Architecture

Figure 12:
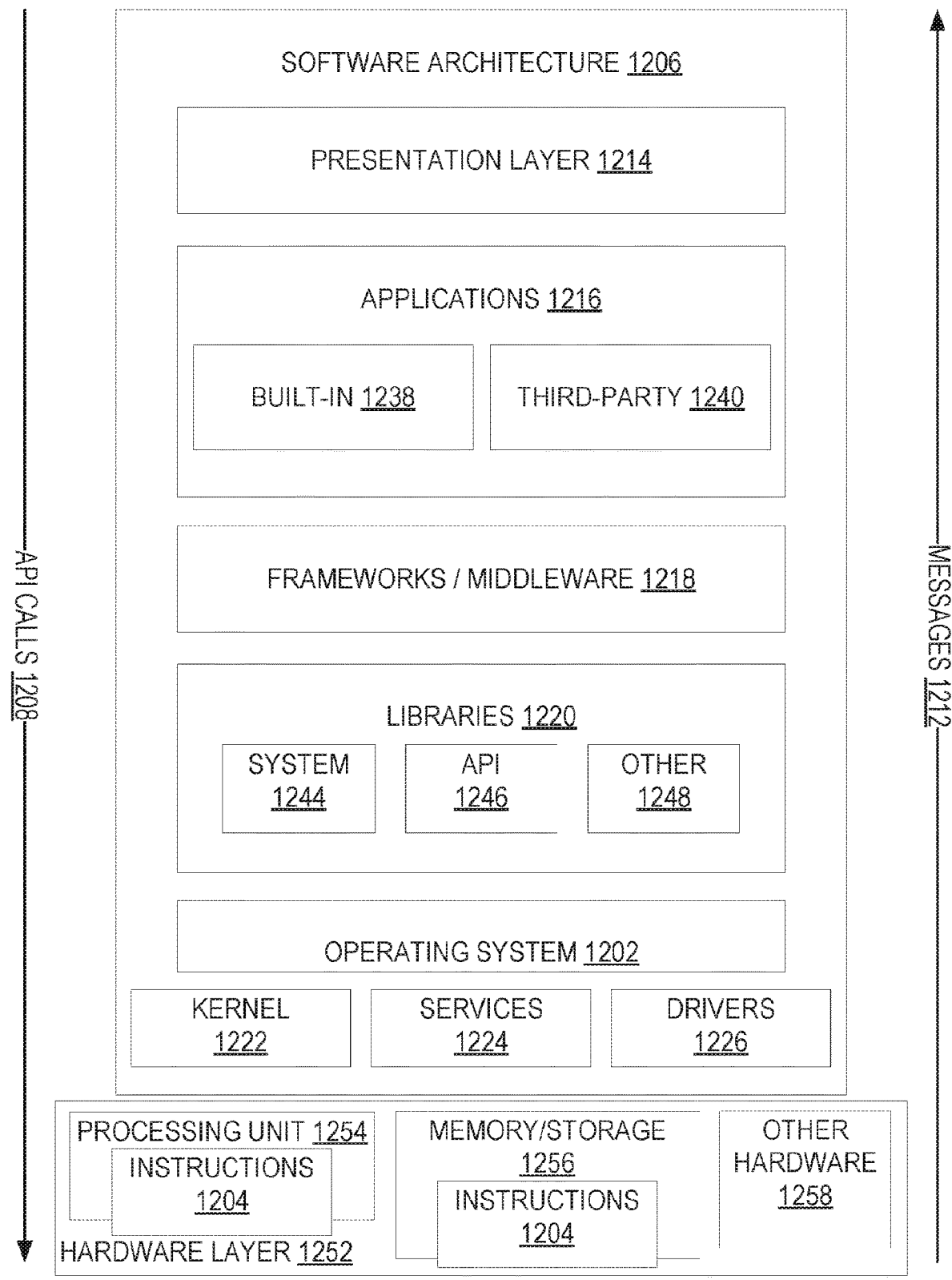
FIG. 12 is a block diagram illustrating a representative software architecture, which may be used in conjunction with various hardware architectures herein described and used to implement various embodiments.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as the machine 1300 of FIG. 13 that includes, among other things, processors 1304, memory 1314, and I/O components 1318. A representative hardware layer 1252 is illustrated and can represent, for example, the machine 1200 of FIG. 12. The representative hardware layer 1252 includes a processing unit 1254 having associated executable instructions 1204. Executable instructions 1204 represent the executable instructions of the software architecture 1206, including implementation of the methods, components and so forth described herein. The hardware layer 1252 also includes memory and/or storage modules memory/storage 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, applications 1216 and a presentation layer 1214. Operationally, the applications 1216 and/or other components within the layers may invoke application programming interface (API) API calls 1208 through the software stack and receive a response as in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224 and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built in operating system functions (e.g., kernel 1222, services 1224 and/or drivers 1226), libraries 1220, and frameworks/middleware 1218 to create user interfaces to interact with users of the system. Alternatively, or additionally, in some systems interactions with a user may occur through a presentation layer, such as presentation layer 1214. In these systems, the application/component "logic" can be separated from the aspects of the application/component that interact with a user.

Figure 13:
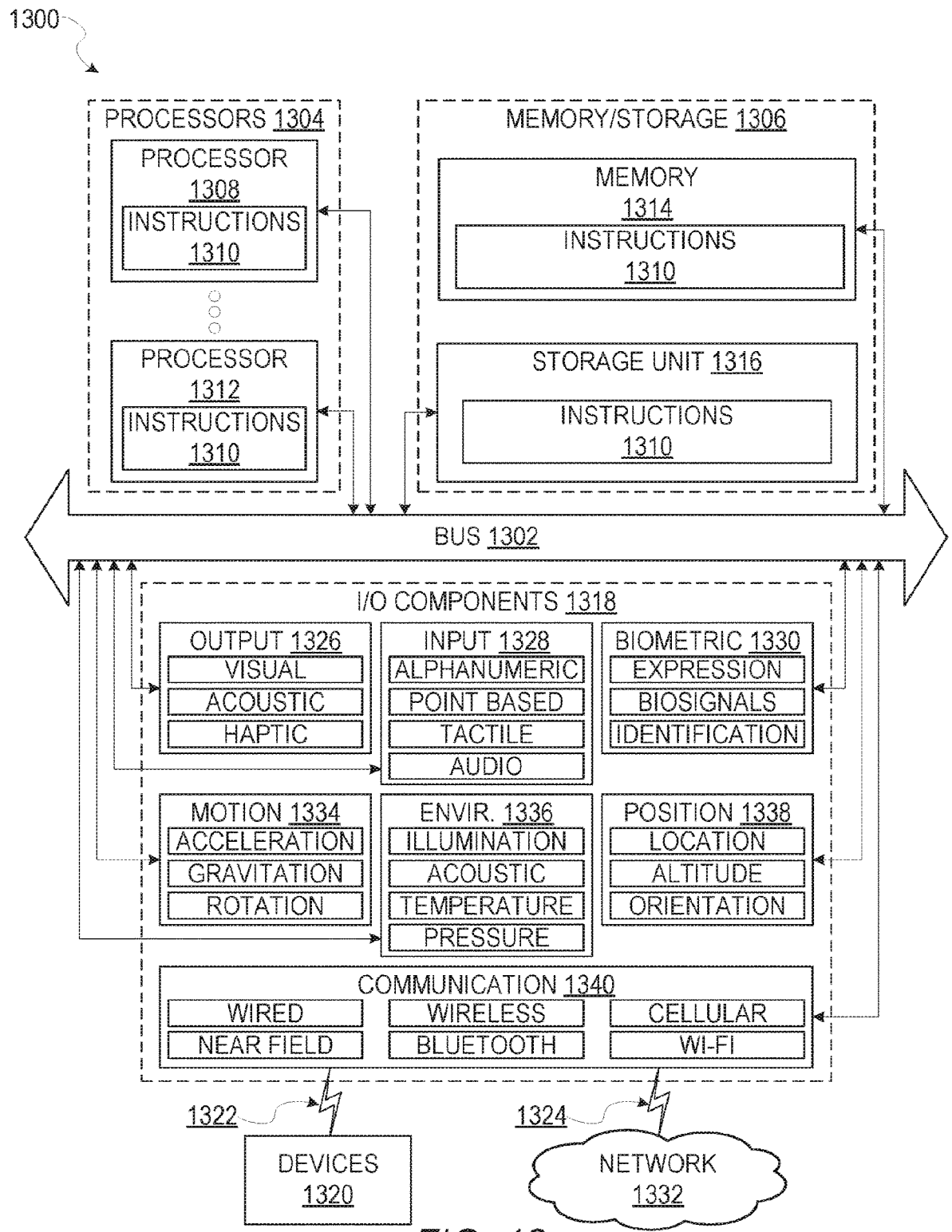
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental environment components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1322 and coupling 1324 respectively. For example, the communication components 1340 may include a network interface component or other suitable device to interface with the network 1332. In further examples, communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a Universal Serial Bus (USB)).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1340, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A system comprising:
a memory; and
at least one hardware processor coupled to the memory and comprising instructions that causes the system to perform operations comprising:
causing display of an image at a client device, the image comprising a set of features;
identifying a display of a first object at a position within the image based on the set of features, the display of the first object comprising an attribute;
accessing a media object from among a collection of media objects based on the attribute of the first object;
presenting the media object based on the position of the display of the first object within the image data;
detecting a trigger stimulus at the client device, the trigger stimulus including an attribute of a second object detected within the image, the attribute of the second object including an object type; and
causing the media object to perform an animation based on the stimulus that includes the object type of the second object.

2. The system of claim 1, wherein the detecting the trigger stimulus further comprises:
detecting a movement of the display of the first object; and
causing the media object to perform an animation based on the movement.

3. The system of claim 2, wherein the movement comprises a directional attribute and a magnitude, and the animation is based on the directional attribute and the magnitude.

4. The system of claim 1, wherein the attribute of the first object includes a shape of the first object, and wherein the identifying the display of the first object further comprises:
detecting the shape of the object based on an object boundary of the display of the first object.

5. The system of claim 1, wherein the display of the first object is a first display that comprises a first object boundary, the position is a first position, and further comprising:
identifying a second display of the second object within the image data, the second display comprising a second object boundary;
detecting a contact between the first object boundary and the second object boundary; and
transferring the media object from the first position to a second position, the second position based on the second object boundary of the second object.

6. The system of claim 1, wherein the display of the first object is a first display that comprises a first object boundary, the attribute of the first object is a first attribute, and further comprising:
identifying a second display of the second object within the image data;
detecting a second attribute of the second object in response to the identifying the second display of the second object; and
causing the media object to perform the animation based on at least the second attribute of the second object.

7. The system of claim 1, wherein the display of the first object is a first display that comprises a first object boundary, the attribute of the first object is a first attribute, and the detecting the trigger stimulus further comprises:
identifying a second display of the second object within the image data, the second display comprising a second object boundary; and
detecting a contact between the first object boundary and the second object boundary.

8. The system of claim 1, wherein the detecting the trigger stimulus further comprises:
detecting an ambient noise, the ambient noise comprising a property; and
causing the media object to perform the animation based on the property of the ambient noise.

9. A method comprising:
causing display of an image at a client device, the image comprising a set of features;
identifying a display of a first object at a position within the image based on the set of features, the display of the first object comprising an attribute;
accessing a media object from among a collection of media objects based on the attribute of the first object;
presenting the media object based on the position of the display of the first object within the image data;
detecting a trigger stimulus at the client device, the trigger stimulus including an attribute of a second object detected within the image, the attribute of the second object including an object type; and
causing the media object to perform an animation based on the stimulus that includes the object type of the second object.

10. The method of claim 9, wherein the detecting the trigger stimulus further comprises:
detecting a movement of the display of the first object; and
causing the media object to perform an animation based on the movement.

11. The method of claim 10, wherein the movement comprises a directional attribute and a magnitude, and the animation is based on the directional attribute and the magnitude.

12. The method of claim 9, wherein the attribute of the first object includes a shape of the first object, and wherein the identifying the display of the first object further comprises:
detecting the shape of the object based on an object boundary of the display of the first object.

13. The method of claim 9, wherein the display of the first object is a first display that comprises a first object boundary, the position is a first position, and further comprising:

identifying a second display of the second object within the image data, the second display comprising a second object boundary;

detecting a contact between the first object boundary and the second object boundary; and transferring the media object from the first position to a second position, the second position based on the second object boundary of the second object.

14. The method of claim 9, wherein the display of the first object is a first display that comprises a first object boundary, the attribute of the first object is a first attribute, and further comprising:

identifying a second display of the second object within the image data;

detecting a second attribute of the second object in response to the identifying the second display of the second object; and causing the media object to perform the animation based on at least the second attribute of the second object.

15. The method of claim 9, wherein the display of the first object is a first display that comprises a first object boundary, the attribute of the first object is a first attribute, and the detecting the trigger stimulus further comprises:

identifying a second display of the second object within the image data, the second display comprising a second object boundary; and detecting a contact between the first object boundary and the second object boundary.

16. The method of claim 9, wherein the detecting the trigger stimulus further comprises:

detecting an ambient noise, the ambient noise comprising a property; and causing the media object to perform the animation based on the property of the ambient noise.

17. A non-transitory machine-readable storage medium comprising instructions that, when executed by one or more processors of a machine, cause the machine to perform operations comprising:

causing display of an image at a client device, the image comprising a set of features;

identifying a display of a first object at a position within the image based on the set of features, the display of the first object comprising an attribute;

accessing a media object from among a collection of media objects based on the attribute of the first object;

presenting the media object based on the position of the display of the first object within the image data;

detecting a trigger stimulus at the client device, the trigger stimulus including an attribute of a second object detected within the image, the attribute of the second object including an object type; and causing the media object to perform an animation based on the stimulus that includes the object type of the second object.

18. The non-transitory machine-readable storage medium of claim 17, wherein the detecting the trigger stimulus further comprises:

detecting a movement of the display of the first object; and causing the media object to perform an animation based on the movement.

19. The non-transitory machine-readable storage medium of claim 18, wherein the movement comprises a directional attribute and a magnitude, and the animation is based on the directional attribute and the magnitude.

20. The non-transitory machine-readable storage medium of claim 17, wherein the attribute of the first object includes a shape of the first object, and wherein the identifying the display of the first object further comprises:

detecting the shape of the object based on an object boundary of the display of the first object.

* * * * *